US012694401B2

(12) United States Patent
Strealy

(10) Patent No.: US 12,694,401 B2
(45) Date of Patent: Jul. 28, 2026

(54) SYSTEMS AND METHODS TO PRODUCE A PHYSICAL ARTICLE THAT PROVIDES ADMISSION AUTHORIZATION TO AN EVENT WHICH CORRELATES TO A DIGITAL ASSET FROM A TEMPORARY WALLET

(71) Applicant: Disney Enterprises, Inc., Burbank, CA (US)

(72) Inventor: Jokton Mishael Strealy, Valdosta, GA (US)

(73) Assignee: Disney Enterprises, Inc., Burbank, CA (US)

( * ) Notice: Subject to any disclaimer, the term of this patent is extended or adjusted under 35 U.S.C. 154(b) by 181 days.

(21) Appl. No.: 18/338,134

(22) Filed: Jun. 20, 2023

(65) Prior Publication Data

US 2024/0046268 A1 Feb. 8, 2024

Related U.S. Application Data

(60) Provisional application No. 63/394,715, filed on Aug. 3, 2022.

(51) Int. Cl.
*G06Q 20/40* (2012.01)
*G06Q 20/10* (2012.01)
(Continued)

(52) U.S. Cl.
CPC ........... *G06Q 20/401* (2013.01); *G06Q 20/10* (2013.01); *G06Q 20/3672* (2013.01); *G06Q 20/3829* (2013.01); *G06Q 2220/00* (2013.01)

(58) Field of Classification Search
CPC ......... G06Q 20/401; G06Q 20/00–425; H04L 9/00–50
(Continued)

(56) References Cited

U.S. PATENT DOCUMENTS 7,611,065 B2 11/2009 Behm
8,290,174 B1 * 10/2012 Simon .................... H04R 3/005
381/79

(Continued)

OTHER PUBLICATIONS

"How to Sell NFT Tickets for an Event", Unlock Labs, https://unlock-protocol.com/guides/how-to-sell-nft-tickets-for-an-event/, May 3, 2022 (11 pages).

(Continued)

*Primary Examiner* — Ari Shahabi
(74) *Attorney, Agent, or Firm* — Esplin & Associates, PC

(57) ABSTRACT

Systems and methods to produce a physical article that provides admission authorization to an event and correlated digital asset from a temporary wallet are disclosed. Exemplary implementations may: establish one or more temporary wallets; effectuate a smart contract that causes the temporary wallets to hold digital assets, where individual digital assets are correlated with event information; generate one or more wallet machine-readable mediums that represent the temporary wallets; generate one or more asset machine-readable mediums that represent the digital assets; cause an output device to output the wallet machine-readable mediums and the wallet machine-readable mediums on physical articles that provide admission authorizations events or locations; upon user devices scanning the wallet machine-readable mediums, the users may be enabled to establish digital wallets or access digital wallets such that the digital asset is transferred from the temporary wallets to the digital wallets.

20 Claims, 5 Drawing Sheets

(51) Int. Cl.
   *G06Q 20/36* (2012.01)
   *G06Q 20/38* (2012.01)
(58) Field of Classification Search
   USPC .......................................................... 705/66
   See application file for complete search history.

(56) References Cited

U.S. PATENT DOCUMENTS

| | | | | |
|---|---|---|---|---|
| 11,282,139 | B1 | 3/2022 | Winklevoss | |
| 11,295,318 | B2 | 4/2022 | Andon | |
| 2015/0324789 | A1 | 11/2015 | Dvorak | |
| 2016/0092988 | A1 | 3/2016 | Letourneau | |
| 2016/0098730 | A1 | 4/2016 | Feeney | |
| 2018/0225638 | A1 | 8/2018 | Ryann | |
| 2019/0180273 | A1 | 6/2019 | Cummings | |
| 2020/0250752 | A1 | 8/2020 | Sugarman | |
| 2020/0273048 | A1* | 8/2020 | Andon | G06Q 10/02 |
| 2021/0012325 | A1 | 1/2021 | Harish | |
| 2021/0248594 | A1* | 8/2021 | Yantis | G06Q 20/123 |
| 2022/0188779 | A1 | 6/2022 | Khaund | |
| 2022/0188839 | A1 | 6/2022 | Andon | |
| 2023/0123865 | A1* | 4/2023 | Quigley | G06Q 20/389 |
| | | | | 705/65 |
| 2024/0020661 | A1 | 1/2024 | Strealy | |

OTHER PUBLICATIONS

"Tictella-NFT Ticketing Platform", https://www.tictella.com/wp-content/uploads/2022/03/wp_en.pdf , Feb. 2, 2022 (19 pages).
"NFTs-New, Fairer Ticketing" , SeatlabNFT Litepaper, https://assets.website-files.com/62543dc4e693bb934ed48f75/62963239e0a0fa583bade929_sea , Jun. 6, 2022 (23 pages).
Zhiyuan Sun, "Ticketmaster Selects Flow Blockchain for Minting NFT Event Tickets", https://cointelegraph.com/news/ticketmaster-selects-flow-blockchain-for-minting-nft-event-tickets , Aug. 3, 2022 (7 pages).
Ezra Reguerra; "From lunch to Solana: Here's the story of the NFT ATM in New York"; https://cointelegraph.com/news/from-lunch-to-solana-here-s-the-story-of-the-nft-atm-in-new-york; Mar. 2, 2022 (5 pages).
Cryptopedia; How To Make a Paper Wallet; "https://www.gemini.com/cryptopedia/paper-wallet-generator-cold-storage"; May 20, 2021 (6 pages).
Wilfred Chan, "What did I just buy?" https://www.theguardian.com/technology/2022/feb/28/nft-vending-machine-new-york-blockchain; Feb. 28, 2022 (5 pages).
Abdul Ghaffar Khan, Amjad Hussain Zahid, Muzammil Hussain, Usama Riaz, "Security of Cryptocurrency Using Hardware Wallet and QR Code ", Department of Software Engineering;University of Management and Technology, https://ieeexplore.ieee.org/document/8966739 , 2019 (10 pages).

* cited by examiner

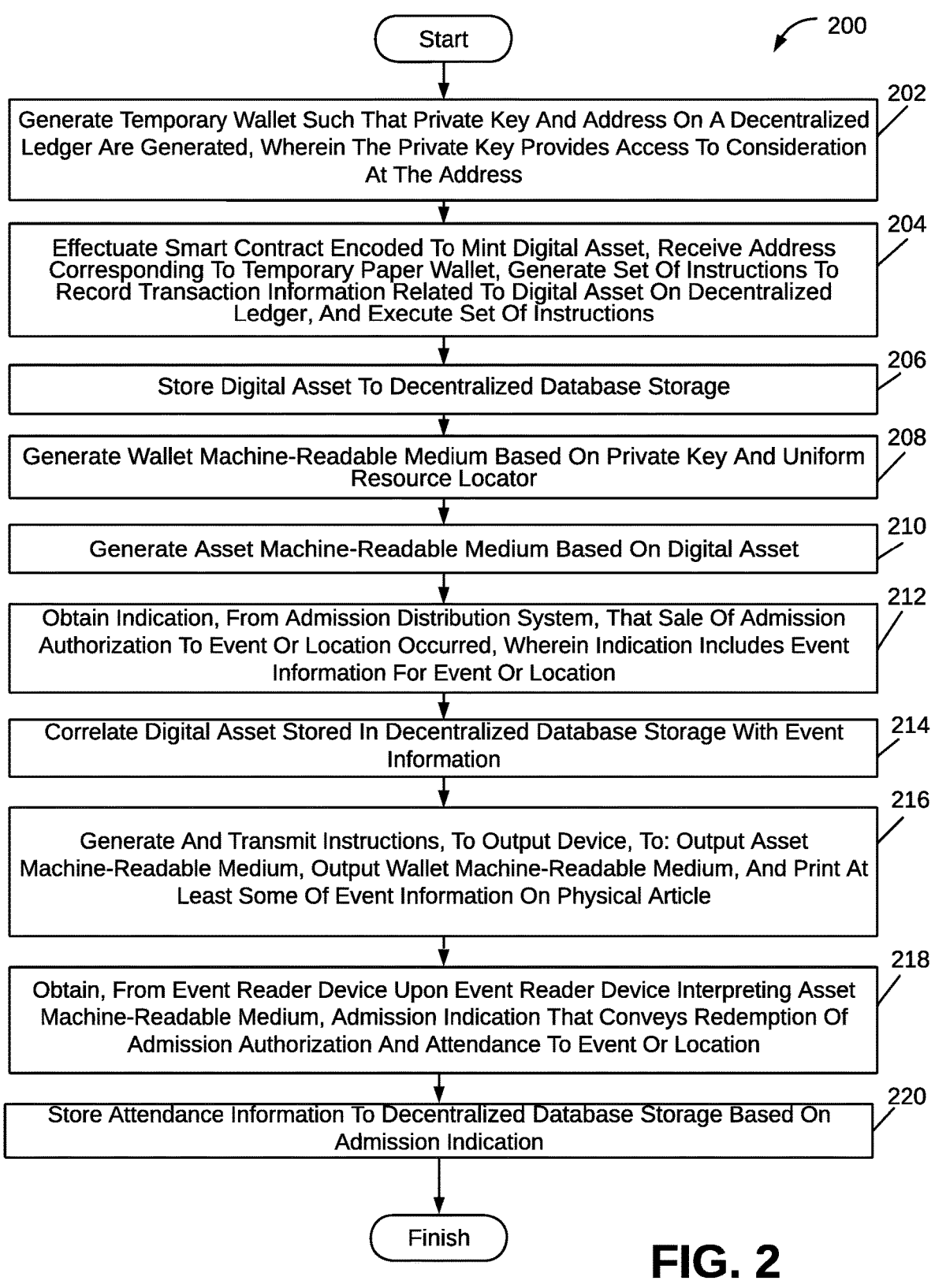

Start

↙ 200

202

Generate Temporary Wallet Such That Private Key And Address On A Decentralized Ledger Are Generated, Wherein The Private Key Provides Access To Consideration At The Address

204

Effectuate Smart Contract Encoded To Mint Digital Asset, Receive Address Corresponding To Temporary Paper Wallet, Generate Set Of Instructions To Record Transaction Information Related To Digital Asset On Decentralized Ledger, And Execute Set Of Instructions

206

Store Digital Asset To Decentralized Database Storage

208

Generate Wallet Machine-Readable Medium Based On Private Key And Uniform Resource Locator

210

Generate Asset Machine-Readable Medium Based On Digital Asset

212

Obtain Indication, From Admission Distribution System, That Sale Of Admission Authorization To Event Or Location Occurred, Wherein Indication Includes Event Information For Event Or Location

214

Correlate Digital Asset Stored In Decentralized Database Storage With Event Information

216

Generate And Transmit Instructions, To Output Device, To: Output Asset Machine-Readable Medium, Output Wallet Machine-Readable Medium, And Print At Least Some Of Event Information On Physical Article

218

Obtain, From Event Reader Device Upon Event Reader Device Interpreting Asset Machine-Readable Medium, Admission Indication That Conveys Redemption Of Admission Authorization And Attendance To Event Or Location

220

Store Attendance Information To Decentralized Database Storage Based On Admission Indication Finish

FIG. 2

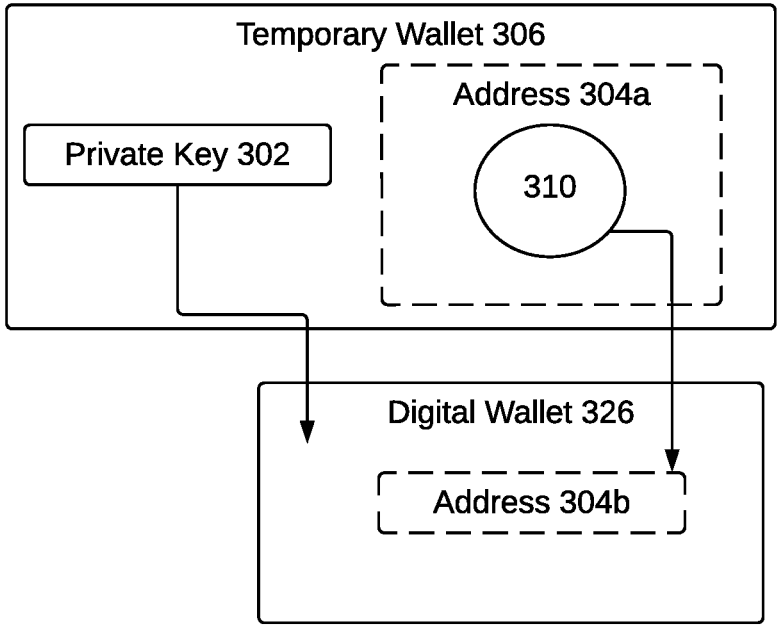
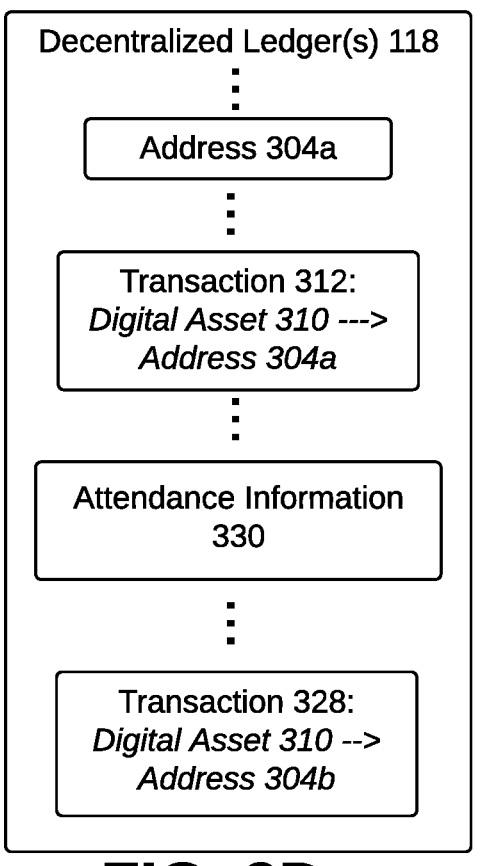
FIG. 3D

SYSTEMS AND METHODS TO PRODUCE A PHYSICAL ARTICLE THAT PROVIDES ADMISSION AUTHORIZATION TO AN EVENT WHICH CORRELATES TO A DIGITAL ASSET FROM A TEMPORARY WALLET

CROSS-REFERENCE TO RELATED APPLICATIONS

The present application claims priority benefit of the U.S. Provisional Patent Application No. 63/394,715 titled "SYSTEMS AND METHODS TO PRODUCE A PHYSICAL ARTICLE THAT PROVIDES ADMISSION AUTHORIZATION TO AN EVENT WHICH CORRELATES TO A DIGITAL ASSET FROM A TEMPORARY WALLET" filed on Aug. 3, 2022, the contents of which are incorporated herein by reference in their entirety. The subject matter of this related application is hereby incorporated herein by reference.

FIELD OF THE DISCLOSURE

The present disclosure relates to systems and methods produce a physical article that provides admission authorization to an event and correlated digital asset from a temporary wallet.

BACKGROUND

Existing admission distribution systems may provide admission authorizations to events or locations. Such admission distribution systems may not enable users who obtain the admission authorizations to obtain digital assets that are associated with the events or locations, which may be collectible assets.

SUMMARY

One aspect of the present disclosure relates to a system configured to enable obtainment of digital assets in addition to obtaining admission authorizations to events or locations. The system may establish a temporary wallet that includes an address recorded on a decentralized ledger and a private key that enables access to such address. A digital asset may be established and a transaction may be recorded on the decentralized ledger specifying that the address of the temporary wallet holds the digital asset. The digital asset may be correlated with event information for an event or location. A physical article that provides an admission authorization to the event or location may include a wallet machine-readable medium that a user holding the admission authorization may scan with their personal smart device to either establish their own digital wallet or access an existing digital wallet, and thus obtain the digital asset held by the temporary wallet. The physical article may additionally include an asset machine-readable medium. Upon a reader device at the event or location scanning the asset machine-readable medium, attendance information may be recognized and stored to the decentralized ledger.

As such, a system that establishes digital assets, distributes the digital assets to individuals that attend events or locations, records attendance to the events or locations, and records ownership of the digital assets by the individuals in a decentralized manner amongst a plurality of distributing computing platforms is provided. A decentralized manner of performing such limitations may ensure that one set of servers does not burden performing all the limitations for a plurality of events and/or locations and risk overwhelming the set of servers. The system may further enable and facilitate increased recordation of ownership of digital assets that are correlated with the events and/or the locations as the system provides individuals a simplified manner to do so. The decentralized manner may additionally ensure that the ownership of the digital assets is not easily mutable unless modified via instructions that are implemented by the distributed computing platforms.

One aspect of the present disclosure relates to a system configured to produce a physical article that provides admission authorization to an event and correlated digital asset from a temporary wallet. The system may include one or more hardware processors configured by machine-readable instructions. The machine-readable instructions may include one or more instruction components. The instruction components may include one or more of temporary wallet generating component, contract effectuation component, medium generating component, output component, attendance component, and/or other instruction components.

The temporary wallet generating component may be configured to generate one or more temporary wallets such that private keys and addresses on a decentralized ledger are generated. The private keys may provide access to consideration at the respective addresses.

The contract effectuation component may be configured to effectuate a smart contract. The smart contract may be encoded to i) mint one or more digital assets, ii) receive the addresses corresponding to the one or more temporary wallets, iii) generate one or more sets of instructions to record transaction information on the decentralized ledger that specifies individual ones of the one or more digital assets are sent to individual ones of the addresses, and iv) execute the set of instructions, and/or other functions. The one or more digital assets may be unique identifiers. The contract effectuation component may be configured to store the one or more digital assets to on a decentralized ledger.

The medium generating component may be configured to generate one or more wallet machine-readable mediums based on the private keys and a uniform resource locator. The uniform resource locator may enable establishment of or provide access to a wallet software package upon a reader device interpreting individual ones of the one or more wallet machine-readable mediums. The medium generating component may be configured to generate one or more asset machine-readable mediums based on the one or more digital assets.

The output component may be configured to obtain an indication that a sale of an admission authorization to an event or location occurred. The indication may be obtained from an admission distribution system. The indication may include event information for the event or location stored in an event database.

The output component may be configured to correlate a first digital asset stored in on decentralized ledger with the event information. The one or more digital assets may include the first digital asset.

The output component may be configured to generate and transmit instructions, to an output device, to: i) output a first asset machine-readable medium that represents the first digital asset stored in on decentralized ledger, ii) output a first wallet machine-readable medium that represents a first private key that provides access to the first digital asset at a first address tracked on the decentralized ledger, and iii) print at least some of the event information on a physical article. The first wallet machine-readable medium is one of the one or more wallet machine-readable mediums. The first asset machine-readable medium is one of the one or more asset machine-readable mediums.

The attendance component may be configured to obtain, from an event reader device upon the event reader device interpreting the first asset machine-readable medium, an admission indication that conveys redemption of the admission authorization and attendance to the event or location. The attendance component may be configured to store attendance information to the decentralized ledger based on the admission indication.

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect, both local and remote. As used herein, the term "determine" (and derivatives thereof) may include measure, calculate, compute, estimate, approximate, generate, and/or otherwise derive, and/or any combination thereof.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF THE DRAWINGS

FIG. 2 illustrates a method to produce a physical article that provides admission authorization to an event and correlated digital asset from a temporary wallet, in accordance with one or more implementations.

FIG. 3D illustrates a transfer of the digital asset from the temporary wallet to the digital wallet of the user holding the physical article upon determination that the digital wallet is established and recordation of attendance information, in accordance with one or more implementations.

DETAILED DESCRIPTION

Figure 1:
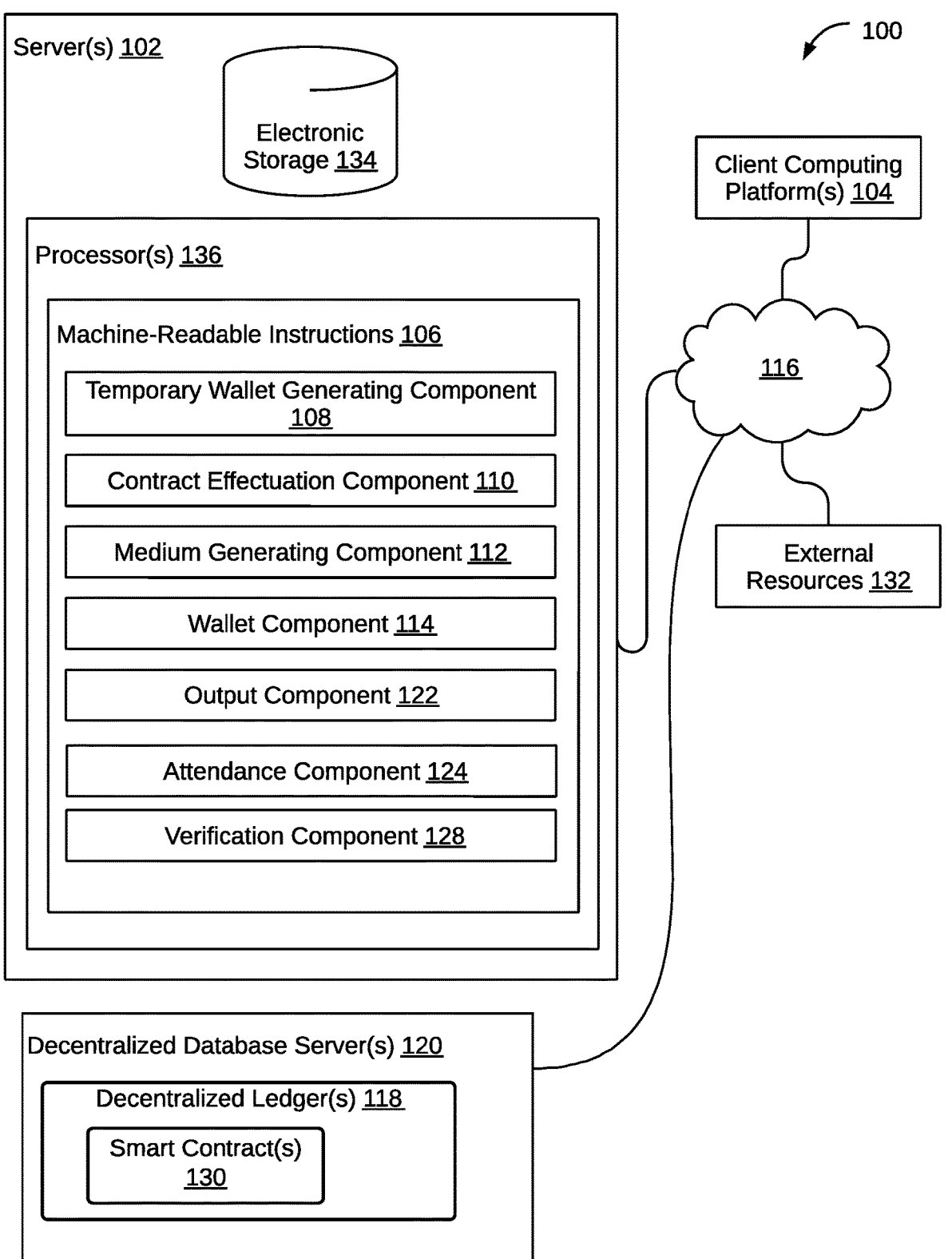
FIG. 1 illustrates a system configured to produce a physical article that provides admission authorization to an event and correlated digital asset from a temporary wallet, in accordance with one or more implementations.

FIG. 1 illustrates a system 100 configured produce a physical article that provides admission authorization to an event or location and a digital asset from a temporary wallet, in accordance with one or more implementations. As admission authorizations to events or locations become more digital, the admission authorizations, e.g., tickets, may be managed on a decentralized ledger 118 as opposed to managed by a single entity. A majority of users may not understand decentralized technology and digital assets tracked on decentralized ledger 118. To encourage obtainment and management of the digital assets by the users, e.g., non-fungible tokens, temporary wallet that hold digital assets may be generated and accompany admission authorizations to events or locations. The temporary wallets may be represented by machine-readable mediums that are accompanied with the admission authorizations, which may be read by reader devices (e.g., camera on a smart device configured to read or scan QR codes or barcodes) of the users to facilitate establishment and/or permanent obtainment of the digital assets. Thus, obtainment and management of the digital assets is eased for the users.

In some implementations, system 100 may include one or more servers 102. Server(s) 102 may be configured to communicate with one or more client computing platform(s) 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

As used herein, the term "digital asset" may refer to a unique identifier tracked on one or more permanent registries. The digital assets may be uniquely identified and/or uniquely identifiable. The unique identifier may include a set of numbers and/or alphabetic characters. As used herein, rights pertaining to digital assets may be tracked, recorded, and/or otherwise registered on one or more permanent registries. As such, an individual digital asset may be a registry-tracked digital asset.

Individual digital assets may be associated and/or correlated with another entity (which may be referred to as a "correlated entity") by virtue of technology provided and/or supported by the one or more permanent registries on which the rights pertaining to the individual digital assets is tracked (including but not limited to smart contracts and/or other executable code on the one or more permanent registries). Accordingly, rights pertaining to a digital asset may correlate to the provision of one or more rights with respect to the correlated entity (e.g., control of the correlated entity and/or accessibility to the correlated entity). Transactions involving a digital asset recorded on a permanent registry may correlate to certain transactions (or modifications) of the correlated entity, and/or vice versa.

Various types and/or combinations of correlated entities are envisioned within the scope of this disclosure, including but not limited to physical article, virtual objects, content, rights, memberships, grants, etc. The use of the singular "entity" or "correlated entity" is not intended to be limiting, as multiple different objects, content, rights, memberships, grants, etc. may be correlated to a single digital asset. By way of non-limiting example, a correlated entity may be a physical article (e.g., artwork, a ticket to an event), a subscription to certain media content, content and so forth. The content may include an image, a video, a graphic image file, a signature of notoriety, a sound bite of an audio file, the audio file, text, and/or other content stored on the permanent registry and/or other electronic storage. In some implementations, the correlated entity may refer to any physical articles, virtual objects, content, rights, memberships, grants, etc. related to art and entertainment for which a user may use, own, sell, trade, loan, destroy, and/or otherwise effectuate a change of ownership, access, or control (including exchanges through challenges).

A digital asset may be fungible if it is functionally and/or physically indistinguishable from another digital asset. A digital asset may be non-fungible if it is unique, or one-of-a-kind. For example, a specific individual may be non-fungible. A digital asset may be semi-fungible if there is a set of a limited number of similar but distinguishable digital assets. For example, a limited amount of images of a sports team for a particular year may be semi-fungible. For example, a digital ticket to a show, concert, exhibition, and/or other event may be semi-fungible. The semi-fungible digital assets are considered as unique, "not fungible", or non-fungible digital assets. In some implementations, the digital assets may include non-fungible tokens, fungible tokens, semi-fungible tokens, and/or other digital assets.

In some implementations, permanent registries, or decentralized ledger(s) 118, may be implemented by registry servers or decentralized database server(s) 120. The terms "permanent registries" and "decentralized ledgers" may be used interchangeably herein. The terms "registry servers" and "decentralized database servers" may be used interchangeably herein. In some implementations, one or more permanent registries may be decentralized and/or immutable registries. In some implementations, the one or more permanent registries may be one or more databases on which the rights pertaining to the individual digital assets are tracked and/or recorded. In some implementations, blockchains may be maintained by distributed computing platforms (not shown in FIG. 1). In some implementations, a distributed computing platform may be implemented by a set of client computing platform(s) 104 and/or servers (including, for example, one or more registry servers). The distributed computing platform may support a virtual machine (not shown in FIG. 1). The distributed computing platform and/or the virtual machine may form a runtime environment for smart contracts and/or other executable code. A distributed computing platform may include electronic storage configured to store part or all of individual blockchains. For example, the smart contracts may be stored on one or more blockchains, and/or another permanent registry. In some implementations, the distributed computing platform may be Ethereum. In some implementations, the distributed computing platform may be similar to or based on Ethereum. In some implementations, the virtual machine may be a distributed and/or decentralized virtual machine.

In some implementations, at least one of the permanent registries may be a private permissioned permanent registry (e.g., a private permissioned blockchain). The private permissioned permanent registry may be configured to record information and/or track addresses (e.g., corresponding to digital wallets, smart contracts, etc.). The recorded information may include rights pertaining to the digital assets. For example, ownership rights and/or other accessibility may be modified. In some implementations, the ownership rights and/or other rights may be indicated by addresses, tracked and recorded by the permanent registries on the registry servers, that correspond to digital wallets of users and transaction information recorded on the permanent registry. In some implementations, a digital asset may be removed from one permanent registry and added or recorded on another permanent registry. In some implementations, at least one of the permanent registries implemented by the registry servers is a public permanent registry (e.g., a public blockchain). The public permanent registry may be configured to be part of either Ethereum mainnet, Ethereum 1.5, Ethereum 2.0, or a derivative of Ethereum 2.0 that is configured to perform transactions of Ether (ETH) between accounts.

Elements of a blockchain or another permanent registry may be grouped together in units that are referred to as blocks. For example, an individual block may include one or more digital assets and one or more transactions. For example, an individual block may be linked to one or more other individual blocks. Individual blocks may be linked or chained together to form a structure of blocks and/or a hierarchy of blocks, such as, e.g., a chain of blocks. An individual block may include one or more digital assets, one or more transactions, smart contracts, and/or other information.

In some implementations, one or more permanent registries implemented by the registry servers may be publicly accessible. In some implementations, for example, the one or more databases may be accessible via a mobile application or a website. In some implementations, one or more permanent registries implemented by the registry servers may be private and/or permissioned. In some implementations, one or more permanent registries implemented by the registry servers may be append-only. In some implementations, existing blocks of one or more permanent registries implemented by the registry servers can substantially not be altered or deleted, unless multiple copies are altered. This is unlikely to happen provided that the multiple copies are stored on different computing platforms, e.g., in different geographical locations. Permanent registries may be replicated on multiple computing platforms, preferably in multiple different geographical locations. Additionally, individual blocks may be linked together in a manner that prevents tampering, such as, e.g., using a hash chain and/or digital signatures. In particular, hash values may be generated using fixed-output-length one-way hashing functions that take variable-length input, and may be effectively impossible (or, at least, computationally infeasible) to reverse. As such, a hashing function may provide one-way encryption. By way of non-limiting example, the hashing function may be SHA-256, BLAKE2, SHAKE256, and/or another hashing function. Contents of individual blocks, transactions, and/or articles may be digitally signed in a manner that proves integrity and/or prevents tampering, e.g., by providing authentication, as well as non-repudiation.

Server(s) 102 may be configured by machine-readable instructions 106. Machine-readable instructions 106 may include one or more instruction components. The instruction components may include computer program components. The instruction components may include one or more of temporary wallet generating component 108, contract effectuation component 110, medium generating component 112, wallet component 114, output component 122, attendance component 124, verification component 128, and/or other instruction components.

In some implementations, server(s) 102, client computing platform(s) 104, and/or external resources 132 may be operatively linked via one or more electronic communication links. For example, such electronic communication links may be established, at least in part, via network 116 such as the Internet and/or other networks. It will be appreciated that this is not intended to be limiting, and that the scope of this disclosure includes implementations in which server(s) 102, client computing platform(s) 104, and/or external resources 132 may be operatively linked via some other communication media.

A given client computing platform 104 may include one or more processors configured to execute computer program components. The computer program components may be configured to enable an expert or user associated with the given client computing platform 104 to interface with system 100 and/or external resources 132, and/or provide other functionality attributed herein to client computing platform(s) 104. By way of non-limiting example, the given client computing platform 104 may include one or more of a desktop computer, a laptop computer, a handheld computer, a tablet computing platform, a NetBook, a Smartphone, a gaming console, a smart watch, an augmented-realty wearable, a virtual-reality wearable, and/or other computing platforms.

External resources 132 may include sources of information outside of system 100, external entities participating with system 100, and/or other resources. In some implementations, some or all of the functionality attributed herein to external resources 132 may be provided by resources included in system 100.

Server(s) 102 may include electronic storage 134, one or more processors 136, and/or other components. Server(s) 102 may include communication lines, or ports to enable the exchange of information with network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 134 may comprise non-transitory storage media that electronically stores information. The electronic storage media of electronic storage 134 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 134 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 134 may include one or more virtual storage resources (e.g., cloud storage, a virtual private network, and/or other virtual storage resources). Electronic storage 134 may store software algorithms, information determined by processor(s) 136, information received from server(s) 102, information received from client computing platform(s) 104, and/or other information that enables server(s) 102 to function as described herein.

Processor(s) 136 may be configured to provide information processing capabilities in server(s) 102. As such, processor(s) 136 may include one or more of a digital processor, an analog processor, a digital circuit designed to process information, an analog circuit designed to process information, a state machine, and/or other mechanisms for electronically processing information. Although processor(s) 136 is shown in FIG. 1 as a single entity, this is for illustrative purposes only. In some implementations, processor(s) 136 may include a plurality of processing units. These processing units may be physically located within the same device, or processor(s) 136 may represent processing functionality of a plurality of devices operating in coordination. Processor(s) 136 may be configured to execute components 108, 110, 112, 114, 122, 124, and/or 128, and/or other components. Processor(s) 136 may be configured to execute components 108, 110, 112, 114, 122, 124, and/or 128, and/or other components by software; hardware; firmware; some combination of software, hardware, and/or firmware; and/or other mechanisms for configuring processing capabilities on processor(s) 136. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, 112, 114, 122, 124, and/or 128 are illustrated in FIG. 1 as being implemented within a single processing unit, in implementations in which processor(s) 136 includes multiple processing units, one or more of components 108, 110, 112, 114, 122, 124, and/or 128 may be implemented remotely from the other components. The description of the functionality provided by the different components 108, 110, 112, 114, 122, 124, and/or 128 described below is for illustrative purposes, and is not intended to be limiting, as any of components 108, 110, 112, 114, 122, 124, and/or 128 may provide more or less functionality than is described. For example, one or more of components 108, 110, 112, 114, 122, 124, and/or 128 may be eliminated, and some or all of its functionality may be provided by other ones of components 108, 110, 112, 114, 122, 124, and/or 128. As another example, processor(s) 136 may be configured to execute one or more additional components that may perform some or all of the functionality attributed below to one of components 108, 110, 112, 114, 122, 124, and/or 128.

Temporary wallet generating component 108 may be configured to generate temporary wallets (e.g., paper wallets). Generating temporary wallets may include generation of one or more private keys and addresses on decentralized ledger(s) 118. An address may be generated based on a public key and a hash function. The public key may be generated based on the private key. Thus, the address may be associated with the private key that it was generated from. The individual addresses may be shared to receive consideration. The private key authorizes control of any consideration associated with the corresponding public key and the corresponding address. The private key may authorize and initiate transactions of the consideration from the address. One or more secret phrases may be generated based on the one or more private keys and may provide access to the consideration at the corresponding addresses. Using the one or more secret phrases to access the consideration at the addresses includes converting the one or more secret phrases to the one or more private keys that it was previously generated from. A secret phrase may be an ordered set of words that represent a human-readable and memorable form of some private key. The secret phrase may be 12, 18, 24, or other amount of words. The consideration may include one or more currencies, cryptocurrencies, digital assets, and/or other consideration.

Figure 3A:
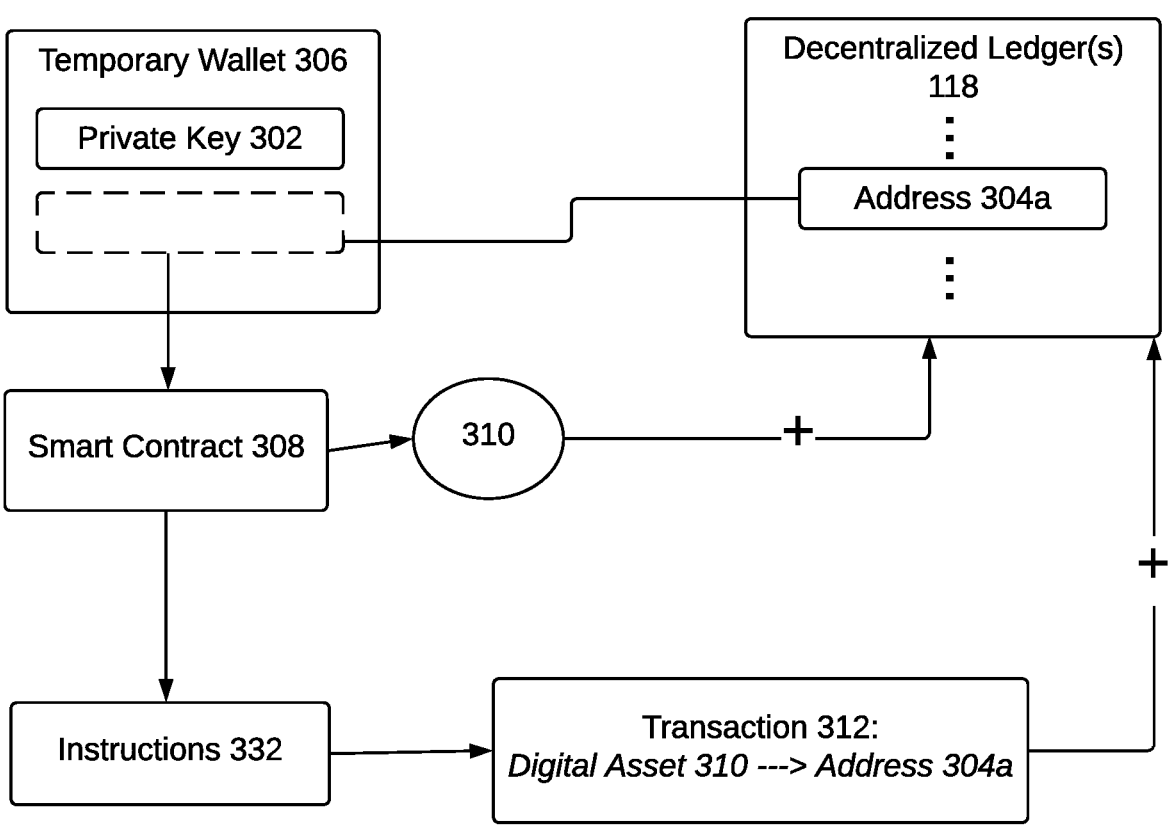
FIG. 3A illustrates an example implementation of the system configured to generate a temporary wallet, mint a digital asset, and establish that the temporary wallet holds the digital asset, in accordance with one or more implementations.

FIG. 3A-3D may illustrate an example implementation of system 100 described in FIG. 1 throughout this Detailed Description. FIG. 3A illustrates a generated private key 302 and an address 304*a* used to establish a temporary wallet 306. Address 304*a* may be recorded on decentralized ledger 118 (e.g., the same illustrated in FIG. 1).

Referring back to FIG. 1, contract effectuation component 110 may be configured to effectuate a smart contract 130. The smart contact may be encoded to mint a digital asset, receive the addresses corresponding to the temporary wallets, generate one or more sets of instructions to record transaction information on decentralized ledger(s) 118 that specify individual ones of the digital assets are sent to individual ones of the addresses, execute the one or more set of instructions, and/or other functions. Smart contract 130 may be configured to transmit the one or more sets of instructions to decentralized database server(s) 120 to execute or otherwise cause execution of the one or more sets of instructions. For example, a first set of instructions may be generated to record first transaction information specifying a first digital asset is sent to a first address. Thus, a first temporary wallet, by way of its corresponding first address, may hold the first digital asset. The first temporary wallet may include a first private key that provides access to the first address. Smart contract 130 may be configured to transmit the first set of instructions to decentralized database server(s) 120 to execute. Thus, decentralized ledger(s) 118 may record that the first temporary wallet holds the first digital asset.

As used herein, the word "mint" may refer to performance, initiating, and/or execution of the process(es), transaction(s), procedure(s), operation(s), and/or step(s) that result in the instantiation of a given digital asset, including the establishment of ownership, and definition of appearance associated with the given digital asset. Minting the given digital asset may include generating the given digital asset record for a given composition entity. In some implementations, minting the given digital asset may include building an executable program. The executable program to be transmitted to a distributed computing platform(s) capable of executing the program. In some implementations, execution of the program by the distributed computing platform may display the entity correlated to the given digital asset on the distributed platforms. In some implementations, the given digital asset record may include values or other information that define the correlated entity. In some implementations, the given digital asset record may be recorded at a given address on decentralized ledger(s) 118 in a smart contract and/or other executable code. The given digital asset record may include information pertaining to the minted given digital asset, not limited to what defines the correlated entity.

Contract effectuation component 110 may be configured to store the digital assets on decentralized ledger 118. The digital assets stored on decentralized ledger 118 and any content or information correlated to the digital assets may be publicly accessible and viewable for verification of attendance to an event as described herein. For example, the first digital asset may be stored on decentralized ledger 118. The digital assets may include the first digital asset and/or other digital assets.

Figure 3B:
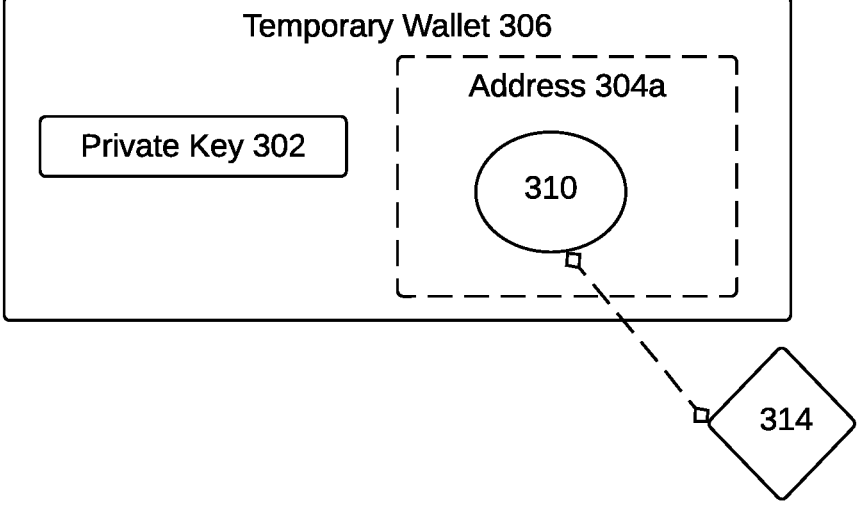
FIG. 3B illustrates the temporary wallet that is associated with an address, a private key that provides authorization to the digital asset at the address, and an entity correlated with the digital asset, in accordance with one or more implementations.

Referring back to FIG. 3A, a smart contract 308 may mint digital asset 310. Digital asset 310 may be stored on decentralized ledger 118 (the same illustrated in FIG. 1). Furthermore, smart contract 308 may receive address 304*a* and generate instructions 332 to record a transaction 312 that specifies digital asset 310 is to be sent to address 304*a*. Transaction 312 may be recorded on decentralized ledger 118. Thus, FIG. 3B illustrates that temporary wallet 306 holds digital asset 310 by way of address 304*a* and private key 302 that enables authorization and initiation of transactions of the consideration from address 304*a*. Digital asset 310, i.e., the consideration, may be correlated with an entity 314 as described in FIG. 1. Entity 314 may be specified as the example implementation proceeds herein.

Referring back to FIG. 1, medium generating component 112 may be configured to generate wallet machine-readable mediums based on the private keys, a uniform resource locator (URL), and/or other information. By way of non-limiting example, a first wallet machine-readable medium may be generated based on the first private key and the URL. A machine-readable medium may be a machine-readable optical code (e.g., a quick response (QR) code, a barcode), a radio frequency identification (RFID) tag, a near field communication (NFC) chip, and/or other machine-readable medium. The URL may enable establishment of or provide access to a wallet software package via an online platform upon a reader device interpreting individual ones of the wallet machine-readable mediums. In some implementations, generating the wallet machine-readable medium may include generating and transmitting instructions to an output device that generates machine-readable mediums. By way of non-limiting example, the output device may be a printer, an RFID device generator, RFID tag generator, and/or other output devices. The instructions may include the private keys, the URL, and/or other information. The reader device may be configured to scan or otherwise read wallet machine-readable mediums to interpret the URL and the private keys imbedded in the wallet machine-readable mediums. In some implementations, the reader device may be included in client computing platform 104 associated with a user. The reader device may include an RFID reader, a QR code scanner, a barcode scanner, an NFC chip reader, a camera on a smart device of the user, and/or other reader devices. Thus, upon the reader device interpreting the wallet machine-readable medium, the URL may be executed.

By way of non-limiting example, the wallet software package may include a web software package, a desktop software package, a mobile software package, virtual computing software package. The wallet software package may be a locally run program that is installed on a computer (the desktop software package), installed on a mobile computing device (the mobile software package), or an extension installed on a web browser (the web software package). The program may run with connection to Internet and store private keys and public keys associated with digital wallets.

Medium generating component 112 may be configured to generate asset machine-readable mediums based on the digital assets. Thus, upon the reader device scanning and interpreting individual ones of the asset machine-readable mediums, the digital assets stored on decentralized ledger 118 may be determined. As such, interpretation of the asset machine-readable mediums may provide access to the digital assets on decentralized ledger 118 and thus any information stored on decentralized ledger 118, electronic storage 134, and/or other electronic storage that the digital assets are correlated to. For example, a first asset machine-readable medium may be generated based on the first digital asset. The interpretation of the first asset machine-readable medium may provide access to the first digital asset on decentralized ledger 118 and thus any information stored on decentralized ledger 118, electronic storage 134, and/or other electronic storage that the first digital asset is correlated to.

Output component 122 may be configured to obtain an indication that a sale of an admission authorization to an event or location occurred. The indication may be obtained from an admission distribution system. The admission authorization to the event or location may enable a user, i.e., a holder of the admission authorization, to attend the event or location physically or virtually. The event or location may be a movie, a concert, a play, a show/movie taping, a theme park, a virtual event (e.g., streamed concert), early access to media content, and/or other events. The indication may include event information for the event stored in an event database (not illustrated) managed by the admission distribution system. The event information may include a name of the event, a physical or virtual location of the event, a start time of the event, an end time of the event, a seat row, a seat number, a seat section, a format of the event, a status, an event sponsor, and/or other event information. In some implementations, a virtual event or location may be or include digital representations of persons, fictional characters, locations, objects, and identifiers such as brands and logos, for example, which populate a virtual reality (VR), augmented reality (AR), or mixed reality (MR) environment. Moreover, that virtual event or location may depict virtual worlds that can be experienced by any number of users synchronously and persistently, while providing continuity of user-related information such as personal identity, user history, entitlements, possessions, payments, and the like. It is noted that the concepts disclosed by the present application may also be applied to events or locations that are hybrids of traditional audiovisual and fully immersive VR/AR/MR experiences, such as interactive video.

Output component 122 may be configured to correlate the first digital asset stored on decentralized ledger 118 with the event information. The correlation enables determination of the event information by way of the first digital asset stored on decentralized ledger 118. Thus, the event information is correlated to the first digital asset. In some implementations, the event information may be stored on electronic storage associated with the admission distribution system, decentralized ledger 118, electronic storage 134, and/or other electronic storage where the event information may be publicly accessible or restricted.

Output component 122 may be configured to generate instructions to: i) output the first asset machine-readable medium that represents the first digital asset stored on decentralized ledger 118, ii) output the first wallet machine-readable medium that represents the first temporary wallet that holds the first digital asset tracked on decentralized ledger(s) 118, and iii) print at least some of the event information on a physical article, and/or other actions. The instructions may be transmitted to the output device. Outputting the first asset machine-readable medium may include selecting the first asset machine-readable medium generated by medium generating component 112 based on the first digital asset. Outputting the first wallet machine-readable medium may include selecting the first wallet machine-readable medium (generated by medium generating component 112) that represents the first private key, which provides access to the first digital asset at the first address tracked on decentralized ledger(s) 118. The wallet machine-readable mediums may include the first wallet machine-readable medium. In some implementations, the output device may be external or separate from the admission distribution system. For example, the first wallet machine-readable medium, the first asset machine-readable medium, and the physical article may be output by an external output device and mailed to the user.

By way of non-limiting example, the physical article may be a piece of paper, a toy, an article of clothing, a plastic card, a collectible article (e.g., a pin), and/or other physical article. In some implementations, the physical article may be associated with and/or be obtained in relation to a virtual object. The virtual object may include a virtual tool, virtual character, virtual pet, an online game, and/or other virtual objects.

In some implementations, the output device may be configured to print wallet machine-readable mediums and/or asset machine-readable mediums as machine-readable optical codes on the physical articles and obfuscate one or more of the machine-readable optical codes. In some implementations, output component 122 may be configured to instruct the output device to obfuscate the machine-readable optical codes. Obfuscating may include adding a silicone-based coating, wax-based coating, a tamper-proof sticker, and/or other obfuscation over the machine-readable optical codes. The obfuscation on the machine-readable optical codes may be removed to expose the machine-readable optical codes.

In some implementations, the output device may be the same as the admission distribution system and the admission distribution system may be configured to output the physical articles, the wallet machine-readable mediums, and/or the asset machine-readable mediums. For example, the admission distribution system may be a kiosk or machine that the sale is completed at by the user and from where the user receives the physical article, the first wallet machine-readable medium, and the first asset machine-readable medium.

Figure 3C:
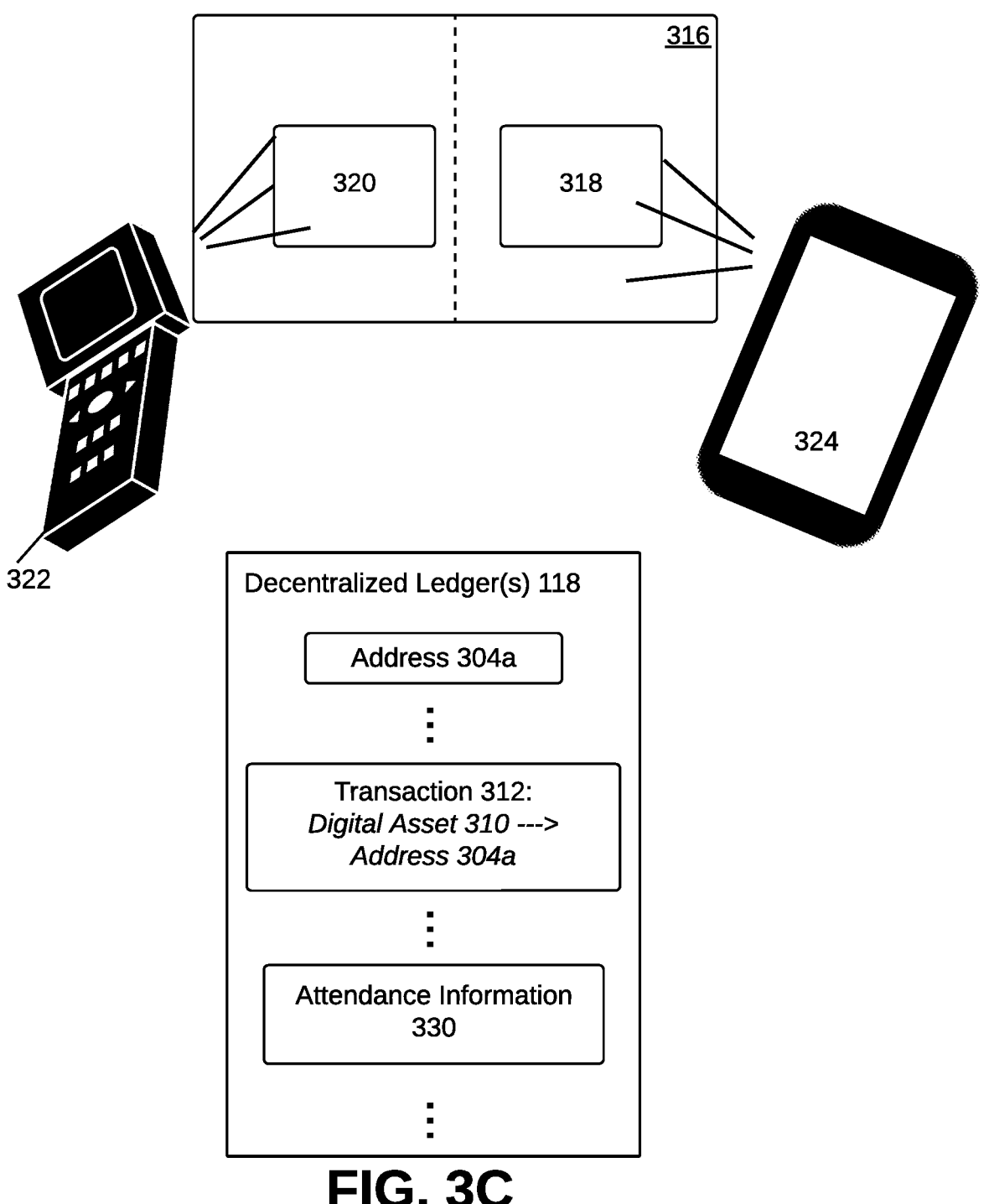
FIG. 3C illustrates a physical article that provides access to a wallet software package that enables transfer of the digital asset from the temporary wallet to a digital wallet of a user holding the physical article, in accordance with one or more implementations.

FIG. 3C illustrates a physical article 316 that includes a wallet QR code 318 and an asset QR code 320 printed on such. Physical article 316 may represent an admission authorization to an event that is obtained by a user. Event information defining the event may be obtained from an admission distribution system (not illustrated) upon obtainment of the admission authorization by the user. Referring to FIG. 3B, the event information may be entity 314 that is correlated with digital asset 310. Referring back to FIG. 3C, some or all of the event information, e.g., date, location, event name, may be printed on physical article 316.

Asset QR code 320 may represent digital asset 310 and correlated entity 314. Wallet QR code 318 may represent private key 302 (illustrated in FIG. 3B) and a URL (not illustrated) that may enable establishment of or provide access to a wallet software package upon a smart device 324 scanning wallet QR code 318. Smart device 324 may belong to the user that holds the admission authorization. Smart device 324 may be a handheld computer, a tablet computing platform, an augmented-realty wearable, a virtual-reality wearable, a smart phone, a tablet computing platform, a smart watch, or another electronic device configured to be connected to another device via a network.

Referring back to FIG. 1, in some implementations, output component 122 may be configured to generate an optical machine-readable code that represents the first digital asset subsequent to the correlation. For example, the optical machine-readable code may be transmitted to and be viewable via client computing platform 104 associated with the user upon the sale of the admission authorization completing online with the admission distribution system by the user.

Output component 122 may be configured to receive, from a second admission distribution system, the first digital asset based on the second admission distribution system interpreting the optical machine-readable code. The second admission distribution system may be, for example, a kiosk at the event at which the user presents the optical machine-readable code in order to receive the first asset machine-readable medium, the first wallet machine-readable medium, and the physical article. The generation and transmission of the instructions to the output device may be responsive to receipt of the first digital asset from the second admission distribution system. The output device may be included in the second admission distribution system (e.g., the kiosk). As such, the second admission distribution system may be configured to output and provide the physical article to the user.

Attendance component 124 may be configured to obtain an admission indication that conveys redemption of the admission authorization and attendance to the event. The admission indication may be obtained from an event reader device upon the event reader device interpreting the first asset machine-readable medium. The event reader device may be a reader device that is located at the event. In some implementations, for a virtual event, the event reader device may utilize reader devices located in client computing platforms 104 associated with users that holds the asset machine-readable mediums. For example, the reader devices that comprise the event reader device may include a camera of client computing platform 104.

Attendance component 124 may be configured to store attendance information on decentralized ledger 118 based on the admission indication. The attendance information may include a time at which the first asset machine-readable medium was read and thus the user attended, an amount of time that the user was late or early based on the time, and/or other attendance information. In some implementations, the attendance information may be stored to electronic storage 134 and/or other electronic storage. Subsequently, the digital assets that the respective asset machine-readable mediums are based on may be correlated to the attendance information stored in electronic storage 134 and/or other electronic storage.

Referring back to FIG. 3C, upon a reader device 322 scanning asset QR code 320, redemption of the admission authorization and attendance to the event may be recognized. Attendance Information 330 related to the user holding the admission authorization may be stored on decentralized ledger 118 (e.g., the same illustrated in FIG. 1 and FIG. 3A).

Referring back to FIG. 1, in some implementations, verification component 128 may be configured to export a copy of the first private key that is represented by the first wallet machine-readable medium subsequent to generation of a paper version of the temporary wallet or non-paper version of the temporary wallet. The copy may be stored in electronic storage 134. Verification component 128 may be configured to verify that the first wallet machine-readable medium includes the first private key. Verifying that the first wallet machine-readable medium correctly includes the first private key may include receiving an interpretation of the first wallet machine-readable medium from a secondary reader. The secondary reader (not illustrated) may be included in system 100 and read the first wallet machine-readable medium. The secondary reader may be a code scanner, a digital code scanner, RFID reader, and/or other reader capable of reading machine-readable mediums. For example, the secondary reader may scan the first wallet machine-readable medium. Verification component 128 may be configured to determine whether the first private key, which is the basis of the first wallet machine-readable medium, is output or otherwise recognized based on the received interpretation and the copy of the first private key. Upon verification, verification component 128 may be configured to destroy the copy of the first private key. Destroying the copy may include deleting the copy from electronic storage 134. Upon determination that the first private key is not interpreted (e.g., not printed correctly, the first wallet machine-readable medium does not output the first private key), the first wallet machine-readable medium may be voided. Voiding a given machine-readable medium may include physically destroying the physical article that the given machine-readable medium is printed on, removing the given machine-readable medium from the physical article, covering the given machine-readable medium on the physical article, and/or other methods of voiding the given machine-readable medium so that it is readable and unusable. In some implementations, the first wallet machine-readable medium may be re-generated based on the first private key and re-verified. In some implementations, the first wallet machine-readable medium may be reprinted on the physical article. In some implementations, the verification the first wallet machine-readable medium correctly includes the first private key may occur prior to printing the first wallet machine-readable medium on the physical article given that it is an optical machine-readable code.

Wallet component 114 may be configured to determine whether the wallet software package is established. Determination of whether the wallet software package is established may be based on the reader device interpreting the individual wallet machine-readable mediums. Responsive to determining that the wallet software package is not established, wallet component 114 may be configured to initiate access to an online platform via the Internet. The URL may initiate the online platform. The online platform may provide the wallet software package and establishment thereof. Subsequently, a user digital wallet for the user may be created based on the wallet software package. In some implementations, prior to access to the online platform and responsive to determining that the wallet software package is not established, wallet component 114 may be configured to effectuate presentation of a guide for establishing the wallet software package via the online platform and for establishing the user digital wallet via the wallet software package. The guide may be presented via client computing platform 104 associate with the user.

Responsive to determining that the wallet software package is established and therefore the user digital wallet exists, wallet component 114 may be configured to initiate the wallet software package. Initiating the wallet software package may include, for example, importing the first private key that is represented by the first wallet machine-readable medium into the user digital wallet. In some implementations, initiating the wallet software package may include determining the first private key based on receipt of a first secret phrase, which is based on the first private key, and subsequently imported into the user digital wallet. Responsive to the import of the first private key, wallet component 114 may be configured to transfer the first digital asset, that is correlated to the event information, from the first address (that the first private key provides access to), and thus the first temporary wallet, to the user digital wallet. The transfer may occur automatically upon the import of the first private key.

In some implementations, wallet component 114 may be configured to generate a second set of instructions. The second set of instructions may record second transaction information specifying that the first digital asset is sent to the user digital wallet. That is, that the first digital asset is recorded at an address included in the user digital wallet. Wallet component 114 may be configured to transmit the second set of instructions to decentralized database server(s) 120 to execute. Thus, decentralized ledger(s) 118 may record that the user digital wallet holds the first digital asset.

In some implementations, wallet component 114 may be configured to effectuate presentation of a notification that expresses confirmation that the first digital asset was transferred from the first temporary wallet to the user digital wallet. The notification may be presented via client computing platform 104 associated with the user.

Referring back to FIG. 3C, upon smart device 324 scanning wallet QR code 318, the wallet software package may be accessed via the URL that is represented by QR code 318. Given that the wallet software package is already established and thus the user owns a digital wallet (as defined in FIG. 1), FIG. 3D illustrates temporary wallet 306 (same as illustrated in FIG. 3B) and private key 302 (same as illustrated in FIG. 3B) importing into a digital wallet 326 of the user from temporary wallet 306. Subsequently, given private key 302, digital asset 310 may be transferred from address 304*a* to an address 304*b* included in digital wallet 326. Thus, digital asset 310 may be held by the user via their digital wallet 326 by way of address 304*b* and private key 302 that enables authorization and initiation of transactions of the consideration from address 304*b*. Additionally, instructions may be generated to record a transaction 328 that specifies digital asset 310 is sent to address 304*b*. Transaction 328 may be recorded on decentralized ledger 118 (the same illustrated in FIG. 1 and FIG. 3A).

FIG. 2 illustrates a method 200 for producing a physical article that provides admission authorization to an event and a digital asset from a temporary wallet, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include generating a temporary wallet such that a private key and an address on a decentralized ledger are generated. The private key may provide access to consideration at the address. Operation 202 may be performed by one or more hardware processors configured by machine-readable instructions including a component that is the same as or similar to temporary wallet generating component 108, in accordance with one or more implementations.

An operation 204 may include effectuating a smart contract encoded to mint a digital asset, receive the address corresponding to the temporary wallet, generate a set of instructions to record transaction information on the decentralized ledger that specifies the digital asset is sent to the address, and execute the set of instructions. The digital asset may be a unique identifier. Operation 204 may be performed by one or more hardware processors configured by machine-readable instructions including a component that is the same as or similar to contract effectuation component 110, in accordance with one or more implementations.

An operation 206 may include storing the digital asset to the decentralized ledger. Operation 206 may be performed by one or more hardware processors configured by machine-readable instructions including a component that is the same as or similar to contract effectuation component 110, in accordance with one or more implementations.

An operation 208 may include generating wallet machine-readable medium based on the private key and a uniform resource locator. The uniform resource locator may enable establishment of or provide access to a wallet software package upon a reader device interpreting the wallet machine-readable medium. Operation 208 may be performed by one or more hardware processors configured by machine-readable instructions including a component that is the same as or similar to medium generating component 112, in accordance with one or more implementations.

An operation 210 may include generating an asset machine-readable medium based on the digital asset. Operation 210 may be performed by one or more hardware processors configured by machine-readable instructions including a component that is the same as or similar to medium generating component 112, in accordance with one or more implementations.

An operation 212 may include obtaining an indication, from an admission distribution system, that a sale of an admission authorization to an event or location occurred. The indication may include event information for the event or location stored in an event database. Operation 212 may be performed by one or more hardware processors configured by machine-readable instructions including a component that is the same as or similar to output component 122, in accordance with one or more implementations.

An operation 214 may include correlating the digital asset stored in the decentralized ledger with the event information. The first digital asset may be one of the digital assets. Operation 214 may be performed by one or more hardware processors configured by machine-readable instructions including a component that is the same as or similar to output component 122, in accordance with one or more implementations.

An operation 216 may include generating and transmitting instructions, to an output device, to: output the asset machine-readable medium, output the wallet machine-readable medium, and print at least some of the event information on a physical article. Operation 216 may be performed by one or more hardware processors configured by machine-readable instructions including a component that is the same as or similar to output component 122, in accordance with one or more implementations.

An operation 218 may include obtaining, from an event reader device upon the event reader device interpreting the asset machine-readable medium, an admission indication that conveys redemption of the admission authorization and attendance to the event or location. Operation 218 may be performed by one or more hardware processors configured by machine-readable instructions including a component that is the same as or similar to attendance component 124, in accordance with one or more implementations.

An operation 220 may include storing attendance information to the decentralized ledger based on the admission indication. Operation 220 may be performed by one or more hardware processors configured by machine-readable instructions including a component that is the same as or similar to attendance component 124, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to produce a physical article that provides (i) admission authorization to an event or location, and (ii) a digital asset from a temporary wallet, the system comprising:

an output device comprising a printer, an RFID device generator, an RFID tag generator, or a combination thereof; and one or more processors configured by machine-readable instructions to:

generate the temporary wallet such that a private key and an address on a decentralized ledger are generated, wherein the private key provides access to consideration at the address;

effectuate a smart contract encoded to i) mint the digital asset, wherein the digital asset is a unique identifier, ii) receive the address corresponding to the temporary wallet, iii) generate a set of instructions to record transaction information on the decentralized ledger that specifies the digital asset is sent to the address, and iv) execute the set of instructions;

store the digital asset on the decentralized ledger;

generate a wallet machine-readable medium based on the private key and a uniform resource locator, wherein the uniform resource locator is configured to cause establishment of, or provide access to, a wallet software package upon a reader device interpreting the wallet machine-readable medium, wherein the wallet software package facilitates creation of a user digital wallet;

generate an asset machine-readable medium based on the digital asset;

obtain an indication, from an admission distribution system, that a sale of the admission authorization to the event or location occurred, wherein the indication includes event information for the event or location stored in an event database;

correlate the digital asset with the event information;

generate and transmit instructions to the output device;

obtain, from an event reader device upon the event reader device interpreting the asset machine-readable medium, an admission indication that conveys redemption of the admission authorization and attendance to the event or location; and store attendance information on the decentralized ledger based on the admission indication; and the output device configured to:

output i) the asset machine-readable medium, and ii) the wallet machine-readable medium; and print at least some of the event information on the physical article.

2. The system of claim 1, wherein the one or more processors are further configured by the machine-readable instructions to:

determine whether the wallet software package is established;

responsive to determining that the wallet software package is not established, initiate access to an online platform, via an Internet connection, that provides the establishment of the wallet software package and the creation of the user digital wallet based on the wallet software package;

responsive to determining that the wallet software package is established and the user digital wallet is created, initiate the wallet software package such that the private key that is represented by the wallet machine-readable medium is imported into the user digital wallet;

transfer the digital asset from the address to the user digital wallet responsive to an import of the private key; and generate a second set of instructions to record second transaction information specifying that the digital asset is sent to the user digital wallet.

3. The system of claim 1, wherein the wallet software package includes a web software package, a desktop software package, a mobile software package, or a virtual computing software package.

4. The system of claim 1, wherein the one or more processors are further configured by the machine-readable instructions to:

export a copy of the private key subsequent to generation of the temporary wallet;

verify that the wallet machine-readable medium includes the private key; and upon verification, destroy the copy of the private key.

5. The system of claim 1, wherein the physical article is associated with and/or obtained in relation to a digital object.

6. The system of claim 2, wherein prior to access to the online platform and responsive to determining that the wallet software package is not established, the one or more processors are further configured by the machine-readable instructions to:

effectuate presentation of a guide for establishing the wallet software package via the online platform and the user digital wallet via the wallet software package.

7. The system of claim 6, wherein the reader device is a client computing platform associated with a user, and wherein the guide is presented via the client computing platform.

8. The system of claim 2, wherein generating the temporary wallet includes generating one or more secret phrases based on the private key, and wherein initiating the wallet software package responsive to determining that the wallet software package is established includes determining the private key based on the one or more secret phrases and subsequently importing the private key into the user digital wallet.

9. The system of claim 1, wherein the one or more processors are further configured by the machine-readable instructions to:

generate, subsequent to correlation of the digital asset with the event information, an optical machine-readable code that represents the digital asset; and receive, from a second admission distribution system, the digital asset based on the second admission distribution system interpreting the optical machine-readable code, wherein the generation and transmission of the instructions to the output device are responsive to receipt of the digital asset from the second admission distribution system, wherein the output device is included in the second admission distribution system, and wherein the second admission distribution system is configured to output the physical article.

10. The system of claim 1, wherein the output device is the same as the admission distribution system, and wherein the admission distribution system is configured to output the physical article, the wallet machine-readable medium, and the asset machine-readable medium.

11. A method to produce a physical article that provides (i) admission authorization to an event or location, and (ii) a digital asset from a temporary wallet, the method comprising:

generating the temporary wallet such that a private key and an address on a decentralized ledger are generated, wherein the private key provides access to consideration at the address;

effectuating a smart contract encoded to i) mint the digital asset, wherein the digital asset is a unique identifier, ii) receive the address corresponding to the temporary wallet, iii) generate a set of instructions to record transaction information on the decentralized ledger that specifies the digital asset is sent to the address, and iv) execute the set of instructions;

storing the digital asset on the decentralized ledger;

generating a wallet machine-readable medium based on the private key and a uniform resource locator, wherein the uniform resource locator is configured to cause establishment of, or provide access to, a wallet software package upon a reader device interpreting the wallet machine-readable medium, wherein the wallet software package facilitates creation of a user digital wallet;

generating an asset machine-readable medium based on the digital asset;

obtaining an indication, from an admission distribution system, that a sale of the admission authorization to the event or location occurred, wherein the indication includes event information for the event or location stored in an event database;

correlating the digital asset with the event information;

generating and transmitting instructions to an output device, wherein the output device comprises a printer, an RFID device generator, an RFID tag generator, or a combination thereof;

outputting, by the output device, i) the asset machine-readable medium, and ii) the wallet machine-readable medium;

printing, by the output device, at least some of the event information on the physical article;

obtaining, from an event reader device upon the event reader device interpreting the asset machine-readable medium, an admission indication that conveys redemption of the admission authorization and attendance to the event or location; and storing attendance information on the decentralized ledger based on the admission indication.

12. The method of claim 11, further comprising:

determining whether the wallet software package is established;

responsive to determining that the wallet software package is not established, initiating access to an online platform, via an Internet connection, that provides establishment of the wallet software package and the creation of the user digital wallet based on the wallet software package;

responsive to determining that the wallet software package is established, initiating the wallet software package such that the private key that is represented by the wallet machine-readable medium is imported into the user digital wallet;

transferring the digital asset from the address to the user digital wallet responsive to an import of the private key; and generating a second set of instructions to record second transaction information specifying that the digital asset is sent to the user digital wallet.

13. The method of claim 11, wherein the wallet software package includes a web software package, a desktop software package, a mobile software package, or a virtual computing software package.

14. The method of claim 11, further comprising:

exporting a copy of the private key subsequent to generation of the temporary wallet;

verifying that the wallet machine-readable medium includes the private key; and upon verification, destroying the copy of the private key.

15. The method of claim 11, wherein the physical article is associated with and/or obtained in relation to a digital object.

16. The method of claim 12, wherein prior to access to the online platform and responsive to determining that the wallet software package is not established, further comprising:

effectuating presentation of a guide for establishing the wallet software package via the online platform and the user digital wallet via the wallet software package.

17. The method of claim 16, wherein the reader device is a client computing platform associated with a user, and wherein the guide is presented via the client computing platform.

18. The method of claim 12, wherein the generating of the temporary wallet includes generating one or more secret phrases based on the private key, and wherein the initiating of the wallet software package responsive to determining that the wallet software package is established includes determining the private key based on the one or more secret phrases and subsequently importing the private key into the user digital wallet.

19. The method of claim 11, further comprising:

generating, subsequent to the correlating of the digital asset with the event information, an optical machine-readable code that represents the digital asset; and receiving, from a second admission distribution system, the digital asset based on the second admission distribution system interpreting the optical machine-readable code, wherein the generation and transmission of the instructions to the output device are responsive to receipt of the digital asset from the second admission distribution system, wherein the output device is included in the second admission distribution system, and wherein the second admission distribution system is configured to output the physical article.

20. The method of claim 11, wherein the output device is the same as the admission distribution system, and wherein the admission distribution system is configured to output the physical article, the wallet machine-readable medium, and the asset machine-readable medium.

* * * * *